United States Patent [19]

Kohler et al.

[11] Patent Number: 5,206,903
[45] Date of Patent: Apr. 27, 1993

[54] AUTOMATIC CALL DISTRIBUTION BASED ON MATCHING REQUIRED SKILLS WITH AGENTS SKILLS

[75] Inventors: Joylee E. Kohler, Broomfield, Colo.; Eugene P. Mathews, Barrington, Ill.; Robert D. Nalbone, Thornton; Craig F. Palmer, Arvada, both of Colo.

[73] Assignee: AT&T Bell Laboratories, Murray Hill, N.J.

[21] Appl. No.: 633,918

[22] Filed: Dec. 26, 1990

[51] Int. Cl.$^5$ .................. H04M 3/00; H04M 3/42; H04Q 3/64
[52] U.S. Cl. ................... 379/309; 379/201; 379/210; 379/214; 379/265; 379/266
[58] Field of Search ............. 379/265, 266, 309, 212, 379/214, 201, 210, 211, 213, 233

[56] References Cited

U.S. PATENT DOCUMENTS

| | | | |
|---|---|---|---|
| 4,400,587 | 8/1983 | Taylor et al. | 179/27 D |
| 4,510,351 | 4/1985 | Costello et al. | 179/27 D |
| 4,620,066 | 10/1986 | Bushnell et al. | 379/266 X |
| 4,694,483 | 9/1987 | Cheung | 379/265 X |
| 4,737,983 | 4/1988 | Frauenthal et al. | 379/221 |
| 4,757,267 | 7/1988 | Riskin | 379/201 X |
| 4,757,529 | 7/1988 | Glapa et al. | 379/266 X |
| 5,008,930 | 4/1991 | Gawrys et al. | 379/212 X |

FOREIGN PATENT DOCUMENTS 0278259 12/1986 Japan ..................... 379/265

OTHER PUBLICATIONS

Bill Maikranz, "IBM's Callpath Explained", Inbound-/Outbound Magazine, Oct. 1989, pp. 15-18.
Keith Dawson, "The Smart Way to Handle Incoming Callers", Inbound/Outbound Magazine, May 1990, pp. 22-34.

*Primary Examiner*—James L. Dwyer
*Assistant Examiner*—Harry S. Hong
*Attorney, Agent, or Firm*—Michael A. Morra

[57] ABSTRACT

Automatic Call Distribution (ACD) equipment is improved by matching the information needs of an incoming caller with the particular expertise of a telemarketing agent who handles such calls. Each incoming call is assigned up to three prioritized skill numbers that estimate skill requirements of the calling party. Each agent possesses up to four skill numbers that represent various particular abilities of that agent. Numbers 1 through 9 are used. Upon arrival of the incoming call, a search is made for a match between the first caller skill number and an available agent possessing that skill. If no match is found, a similar search is made with respect to the second caller skill number. After a predetermined delay, a search is made with respect to the third caller skill number. When a match is found, the incoming call is connected to the agent possessing that skill. The longer that an incoming call remains unanswered, the larger the pool of agents becomes that will be allowed to handle the call. Although the specific expertise sought may not be matched, the present technique optimizes the matching process when a time constraint is imposed.

15 Claims, 9 Drawing Sheets

SPLIT NUMBER 1

| AGENT | SKILL LEVELS | | | |
|---|---|---|---|---|
| 1 | 1 | - | - | - |
| 2 | 1 | 2 | - | - |
| 3 | 1 | 2 | 3 | - |
| 4 | 1 | 2 | 3 | 4 |
| 5 | 2 | 1 | - | - |
| 6 | 2 | 1 | 3 | - |
| 7 | 3 | 4 | 5 | 6 |
| 8 | 3 | - | - | - |
| 9 | 4 | 2 | 5 | - |
| 10 | 5 | 1 | 6 | - |
| 11 | 5 | 4 | 6 | 2 |
| 12 | 6 | 4 | - | - |

*FIG. 3*

AUTOMATIC CALL DISTRIBUTION BASED ON MATCHING REQUIRED SKILLS WITH AGENTS SKILLS

TECHNICAL FIELD

This invention relates generally to electronic switching equipment and particularly to the routing of incoming telephone calls to appropriate destinations.

BACKGROUND OF THE INVENTION

Automatic Call Distributors (ACDs) provide a capability that is frequently designed into Private Branch Exchange (PBX) equipment, that routes incoming telephone calls to selected destinations. Many relatively large companies provide call-in service for the convenience of their customers and potential customers. Reservation and information services provided by many airlines are familiar examples. Typically, such companies maintain one or more ACDs that route calls to various agents according to the particular telephone number dialed. In one system, calls to each particular telephone number are routed to a group of agents who possess skills needed for handling calls to that number. Calls to each particular number are placed in a queue and served in sequence according to the order in which they are received. Frequently one queue is long when another is empty, and it is known to allow agents who possess multiple skills to handle several queues. Indeed, in some systems each agent handles up to three types of calls. Unfortunately, this "one-to-many" scheme has its limitations. It is inefficient to assign agents to multiple queues where each queue identifies the same apparent need of the caller, because other needs are overlooked which may be useful in completing the call in a timely manner.

In another system, each agent is associated with a particular type of call, and each call is placed in several queues. This "many-to-one" scheme is also limited. Here, load sharing among agents requires that calls be initially queued to those agents having predetermined specific skills. Like the first described system, success in matching caller needs with available skills requires either a large pool of agents or suffers long waiting times. Thus, assigning incoming calls to multiple queues, each exclusively served by a specific agent, has the disadvantage that the agent is inefficiently utilized because only one of his/her skills is activated.

Both of the above-described systems are quite similar since, for example, it makes little difference whether each caller is placed in three queues—each queue being served by a single group of agents, or whether each caller is placed in a single queue served by three groups of agents. So long as callers are assigned to queues with little regard for their specific needs, or agent skills are rigidly administered, there is little guarantee that the best tradeoff can be made in matching agents with callers in minimum time.

In the business information environment, agents are grouped according to their skills. Companies that provide agent services are not only concerned with matching customer needs and agent skills, but also with minimizing the number of agents (and hence expenses). The effective utilization of agents within and between groups thereof, while matching callers and agents in a timely manner, is a well-known problem in the industry.

SUMMARY OF THE INVENTION

The foregoing problems are solved and an advance in the art is obtained by a novel method for routing incoming telephone calls to available agents. Each incoming call is assigned one or more call-skill indicators that represents a particular need of the calling party. Each agent possesses at least one agent-skill indicator associated with him/her that represents a particular ability of that agent deemed useful in satisfying a caller need. Upon arrival of the incoming call, a search is made to match any one of the call-skill indicators of the incoming caller with a corresponding agent-skill indicator of an available agent. Thereafter, the incoming call is connected to the available agent in accordance with a favorable match between their respective skill indicators.

In an illustrative embodiment of the invention, calls to a particular telephone number are queued to a first group of agents. Numbers 1 through 9 are used as skill indicators for the caller and the agent. Each incoming call is assigned up to three prioritized skill numbers based on the particular telephone number dialed. Similarly, each agent possesses up to four skill numbers, also identified as numbers 1 through 9, representing their abilities. A search is made among the available agents for an agent-skill number that matches the first call-skill number. If no match is found after a predetermined time delay, a search is made with respect to the second call-skill number. Finally, after another predetermined time delay, a search is made with respect to the third call-skill number. At this point the caller is waiting for an agent with any of the three call-skill numbers. To minimize any further delay, a search is commenced at this time for an agent, not among the first group of agents, that possesses a special agent-skill. This special skill frequently comprises the minimum ability which is still useful in handling incoming calls; although, in some applications, the special agent-skill is associated with supervisory personnel.

It is a feature of the present invention that Automatic Number Identification (ANI) information can be used in conjunction with the dialed telephone number to improve the match between caller and agent.

BRIEF DESCRIPTION OF THE DRAWING

The invention and its mode of operation will be more clearly understood from the following detailed description when read with the appended drawing in which:

FIG. 3 illustrates cross-trained agents having up to four skills in the Tourist Information Service example;

DETAILED DESCRIPTION

Definitions

Throughout this patent, certain terms have special meaning to those skilled in the design of call distributing equipment. So that others might be able to better understand the present invention, a list of these terms along with a brief definition is provided.

Automatic Call Distribution (ACD)—A feature that directs calls to agents that have been administered in groups called splits.

Agent—A member of an ACD split.

Call Vectoring—A method that manages inbound calls, using routing tables, called vectors, to uniquely define treatments for each call type. The call is based on the dialed number or trunk-group termination to a vector via Vector Directory Numbers. The vectors are programmable using commands that resemble a high level programming language to specify what treatments the call should be given.

Skill—An ability associated with an incoming telephone call, which is needed for completing the call; and an ability possessed by an ACD agent, which is used in completing the call.

Split—A group of ACD agents organized to receive calls in an efficient and cost-effective manner. Also called bay or gate.

VDN—A Vector Directory Number is an extension number that terminates to a vector. In addition to the particular telephone number dialed, other information such as time of day or the telephone number of the calling party may be used in selecting the VDN. Calls to the VDN are processed by the vector to which the VDN points.

Vector Command—A command used in call vectoring to specify the type of treatment the call will receive. Commands include main or backup ACD split queuing with priority levels and inflow threshold checking; delays with specified feedback such as ringback, music, silence or announcements; routing to internal or external destinations; and unconditional and conditional branching. Conditional branching is based on call-handling conditions of the ACD splits, or on time of day and day of week.

Vector Step—One of a number of steps that are processed sequentially unless a step with a Goto command or Stop command is encountered or vector processing terminates. A step consists of an action to be taken and the information needed to complete the action.

Vectors—Easily programmed routing tables for processing incoming calls that provide various responses to the caller before the call is answered or receives other treatment.

Figure 1:
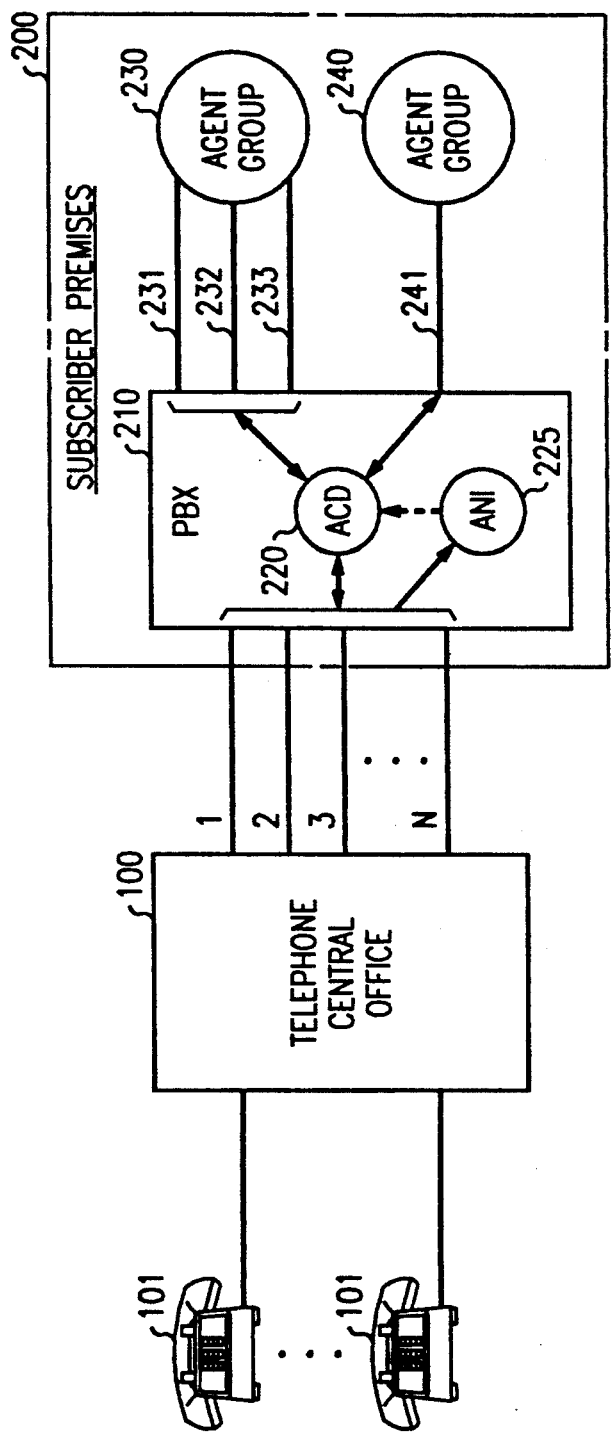
FIG. 1 shows an overview of the generalized operation of an Automatic Call Distributor such as used in the present invention.

FIG. 1 provides an example overview of the generalized operation of the ACD function in the context of the present invention. ACD equipment 220 is located within a Private Branch Exchange (PBX) 210, such as the AT&T DEFINITY ® system, at subscriber premises 200. PBX 210 is connected to telephone central office 100 over N wire-pairs called "trunks." In this example, the subscriber offers a different telephone number for each customer service. One number is used for inquiries concerning new products while another is used for complaints. Agent group (split) 230 handles new products and agent group 240 handles complaints.

Note that three lines 231, 232, 233 are used for new products while only one line 241 is available for complaints. ACD 220 determines which telephone number was dialed and then routes the call to the appropriate split. So long as there are fewer incoming callers 101 active at any one time than there are trunks, no incoming caller will be blocked from reaching the PBX 210.

Automatic Number Identification (ANI) function 225 also resides within PBX 210 to capture the calling telephone number and store it, along with other information about the call, in memory. This information is received over trunks 1-N from the telephone central office 100, and is useful in determining which agent group an incoming call will be routed to, or which agent within a group will handle the call.

After incoming callers 101 reach the PBX 210, it is possible that they cannot be immediately connected to an agent, but will have to wait in a queue until an agent becomes available. The present invention offers significant advantages by taking into account the available skills of the agents and the skill requirements of the callers to match callers and agents with greater timeliness than is presently available. Three different examples of the inventive skill matching technique are provided.

EXAMPLES

Imagine a business called "U.S. Tourist Information Service." This business advertises itself as providing detailed information to callers about anything and everything a tourist would want to see anywhere in the United States. It publishes "900" numbers, one for each State of the Union. Each State is handled by a separate group of dedicated agents, each of whom has detailed knowledge of the tourist sites in that State. Many agents have been cross-trained and have knowledge of multiple States. Using the present invention, the needs of the "U.S. Tourist Information Service" can be met.

Figure 2:
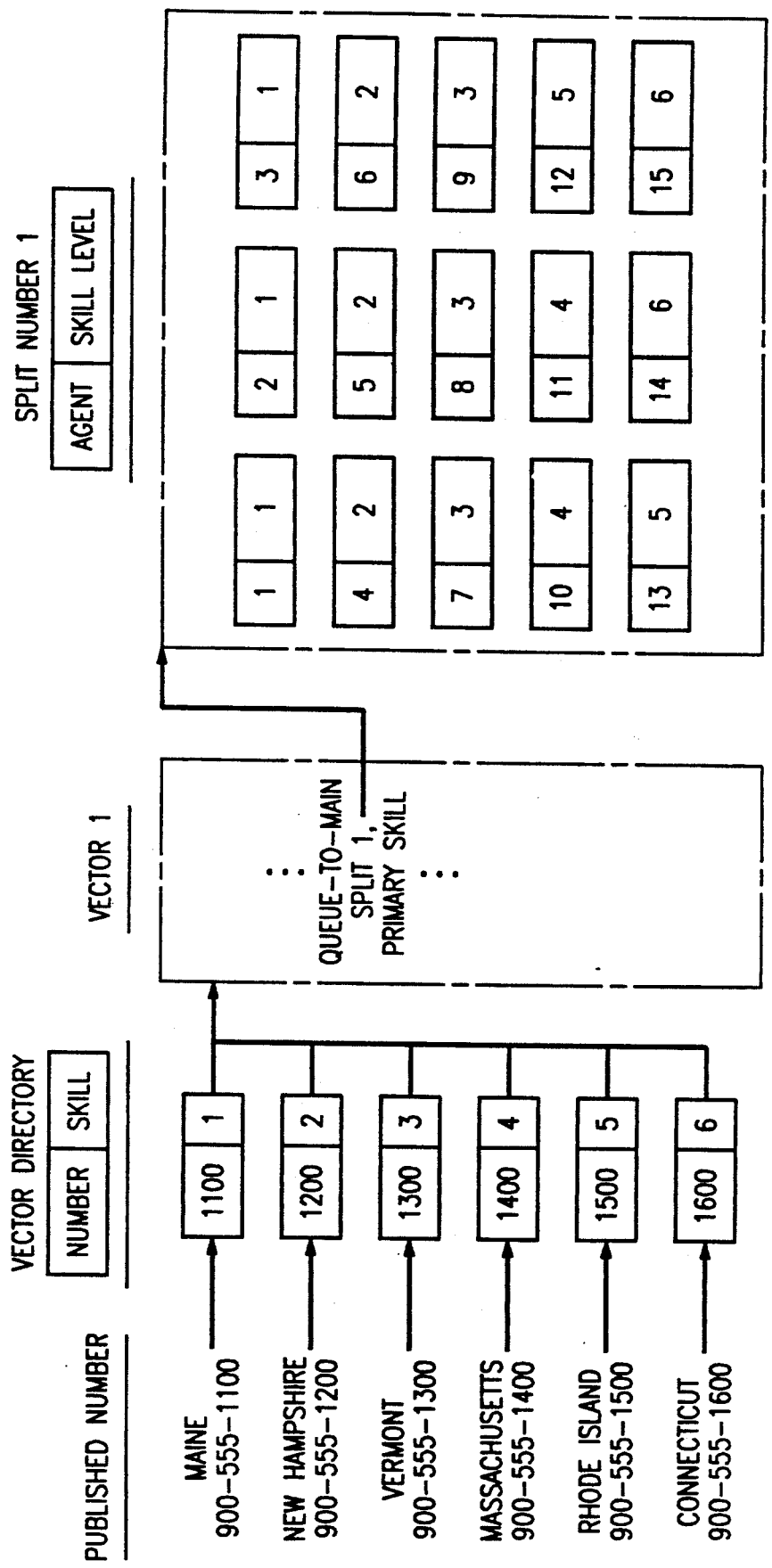
FIG. 2 illustrates use of the present invention in a Tourist Information Service example.

Each "900" number enters the PBX system as a unique extension number to be processed by the ADC. This extension number is also referred to as a Vector Directory Number (VDN) because calls are "vectored" (i.e., routed) to their final destination based in part on the extension number. The fifty States are grouped by region with six or less States per region. Each region is assigned to a unique split. Callers seeking information regarding a particular State dial different telephone numbers (VDNs) according to the particular State. Nevertheless, all callers for a particular region are lumped together, but a number is associated with each particular call to indicate preference for a particular State. With this arrangement all fifty States can be handled with a total of nine splits rather than fifty splits. The arrangement of the New England region for the ACD is illustrated in FIG. 2.

In the example, calls for tourist information for the State of Main would dial the number "900-555-1100" which will enter the ACD as the VDN extension "1100." VDN extension "1100" has skill 1 assigned to it by a System Administrator. VDN extension "1100" is terminated at vector number 1, which has a Queue-To-Main step that queues to split number 1 using the Primary skill of the VDN. Agents number 1, 2, and 3 in split number 1 are logged in and have indicated that they can handle calls of skill 1. When the ACD scanning task attempts to connect callers to available agents, the skill of the call is compared to the skill of the agent, and only when the skills match will the call be delivered to the agent. This means that when a call for the State of Maine comes in, it will be queued to split number 1. Even if there are available agents in split number 1 for States other than Maine (different agent skills), the call will not be connected until an agent with the ability to handle Maine calls (agent-skill 1) becomes available.

Through the use of the present invention, the U.S. Tourist Information Service is able to handle 50 distinct services with 50 distinct groups of agents in the space of only nine splits. The first example is one of the simplest methods of distributing agent skills in accordance with the invention-simple because each agent only uses one skill and each VDN only uses one skill. For the second example, let us build on the first example and use more of the capabilities of the invention.

Suppose that as time goes by, agents become cross-trained and can handle more than one State in their region. Agents can indicate the ability to handle multiple States by entering up to four different agent skills, although the invention is not limited to this number. FIG. 3 shows the agents in split 1 and their various skills.

The agents are instructed to dial the agent skill dial access code after they log in, and enter the one to four digits corresponding to the services that they are trained for. In the example, agent 1 is only trained for agent-skill 1 (Maine); agent 2 is trained for agent-skills 1 and 2 (Maine and New Hampshire); and agent 4 is trained for agent-skills 1, 2, 3, and 4 (Maine, New Hampshire, Vermont, and Massachusetts). This arrangement allows an agent to answer a call for any of the agent skills that they have specified. The net result is that (i) many separate services can be handled by the agents in one split, and (ii) only those agents trained to handle the service will receive those calls.

What about the agents who can handle every State in their region? With only four skills activated per agent, an agent can not enter all six State agent skills. This problem is resolved by adding a Regional skill capability as set forth in the Table below:

| Agent Skill | Meaning |
| --- | --- |
| 1 | Maine |
| 2 | New Hampshire |
| 3 | Vermont |
| 4 | Massachusetts |
| 5 | Rhode Island |
| 6 | Connecticut |
| 7 | New England Expert |

Figure 4:
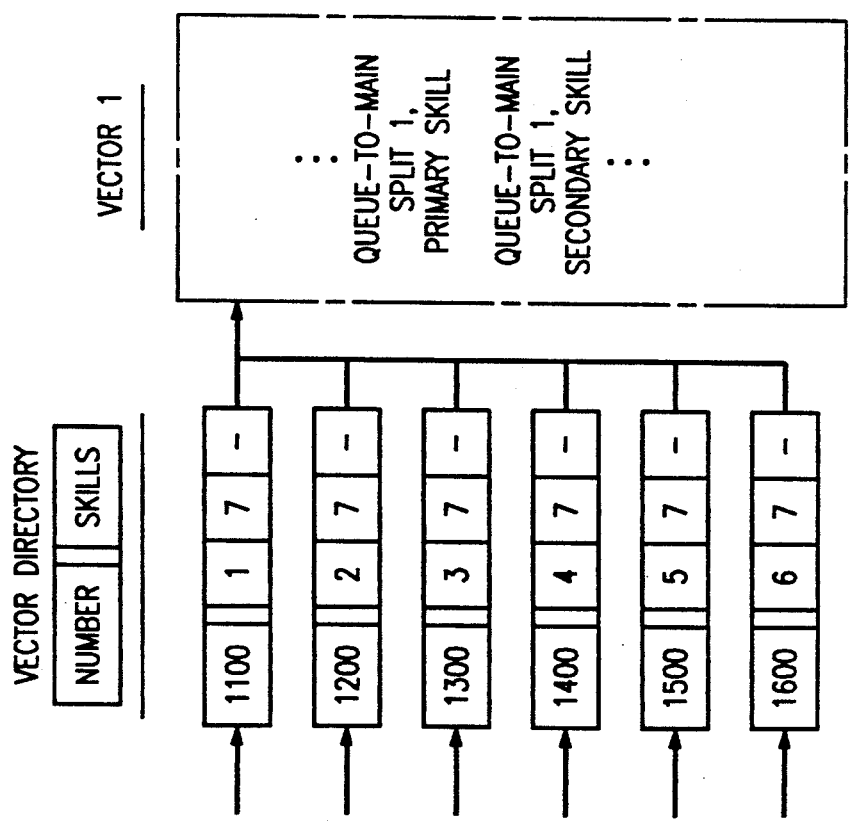
FIG. 4 illustrates a VDN and Vector configuration which adds skill number 7 to the Tourist Information Service example.

Notice that a new skill 7 has been added for use by agents who can handle any State in the New England Region. To make use of the agent-skill 7, we must also change the incoming VDNs and the vector that processes calls to the VDN. FIG. 4 shows the modified VDNs and vector.

With the new configuration, agents who can handle calls for any State in the New England region activate agent-skill 7 only. When a call for any of the six VDNs comes into the system, vector 1 will first queue the caller using the Primary skill of the VDN, which is the individual State skill. After the first Queue-To-Main-Split command, the caller is queued using the Secondary VDN skill, which is skill 7 for all of the VDNs. This second command does not re-queue the caller, but instead adds skill 7 to the list of skills, any of which can be matched to an available agent. The result is that any call to the New England region can be handled by either an available agent with the specific State agent-skill (1-6) or by an available agent with agent-skill 7.

Although it is important to match the skills of agents to callers, the longer the call waits, the more important it may become to have the call answered by any available agent in the split, even if they are not the most qualified to handle the call. Taking the skill definition from the previous example, let's add another definition for the skills, as seen in the Table below:

| Agent Skill | Meaning |
| --- | --- |
| 1 | Maine |
| 2 | New Hampshire |
| 3 | Vermont |
| 4 | Massachusetts |
| 5 | Rhode Island |
| 6 | Connecticut |
| 7 | New England Expert |
| 8 | New England Backup |

Figure 5:
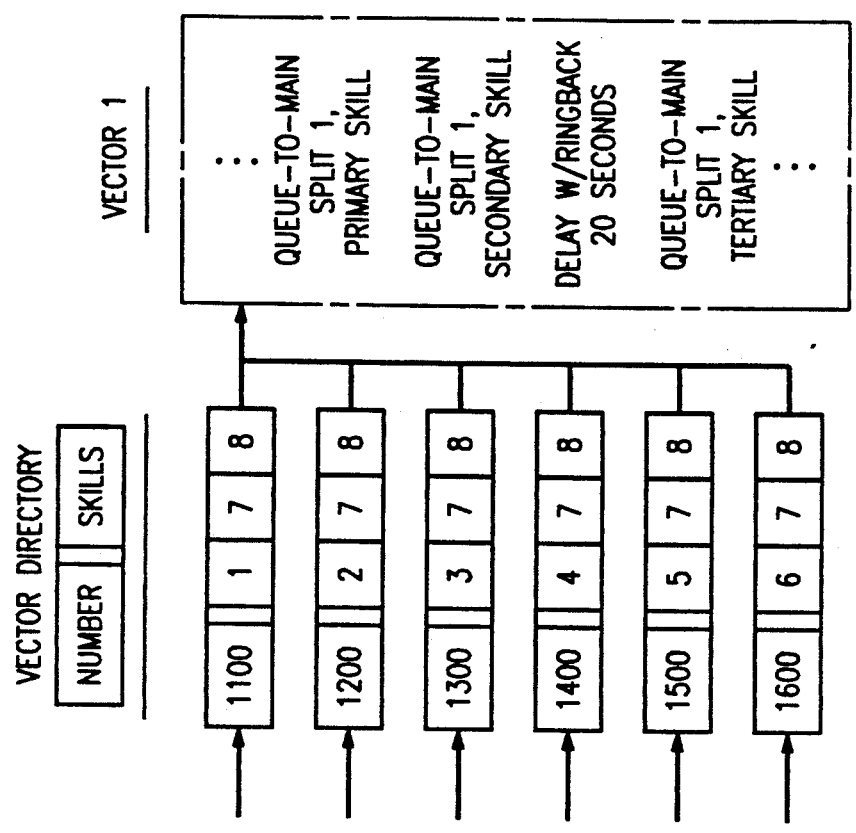
FIG. 5 illustrates a VDN and Vector configuration which adds skill number 8 to the Tourist Information Service example.

Agent skill 8 is intended for agents who have some knowledge about all of New England, and can reasonably handle a call from any State in the region, if they have to. Once again, the VDNs and vector must be modified to use this new agent-skill 8. FIG. 5 shows the modified VDNs and vector.

With the new arrangement, agents in split 1 would still activate their individual skill or skills, however, if the agent was deemed competent to deal with a call to any State in the region (but not an expert) the agent would be instructed to enter agent-skill 8 also.

A call coming into the last-mentioned arrangement would first queue to split 1 with the Primary VDN skill (the specific skill 1-6 for the State), immediately queue with the Secondary VDN skill (New England Expert skill 7) and then delay 20 seconds. If, after 20 seconds, the call has not been answered, the third Queue-To-Main-Split command is executed which will add the Tertiary VDN skill to the call. What this means is that after 20 seconds, we are more interested in having the call answered than we are interested in having the call handled by an expert for the particular State.

The result of the new arrangement is that the longer a call waits, the larger the pool of agents we are willing to consider for handling the call. This example makes more effective use of the agents while attempting to insure that calls will be answered by agents that can handle those calls.

Finally, in the ultimate example, let's further modify the arrangement so that other splits can be considered for handling calls to the New England region. To the agent skill definition for the New England region, we will add a ninth and final skill definition:

| Agent Skill | Meaning |
| --- | --- |
| 1 | Maine |
| 2 | New Hampshire |
| 3 | Vermont |
| 4 | Massachusetts |
| 5 | Rhode Island |
| 6 | Connecticut |
| 7 | New England Expert |
| 8 | New England Backup |
| 9 | Mid-Atlantic Region |

Agent-skill 9 says that the agent can handle a call for any State in the Mid-Atlantic region—a region usually handled by an entirely different split. The degree of competence for the agent-skill 9 is about the same as an agent with agent-skill 8—although not preferred, the agent can handle a call for any State in the region. Likewise the Mid-Atlantic region has a similar agent-skill Definition:

| Agent-Skill | Meaning |
|---|---|
| 1 | New York |
| 2 | Pennsylvania |
| 3 | New Jersey |
| 4 | Maryland |
| 5 | Delaware |
| 6 | Virginia |
| 7 | Mid-Atlantic Expert |
| 8 | Mid-Atlantic Backup |
| 9 | New England Region |

Figure 6:
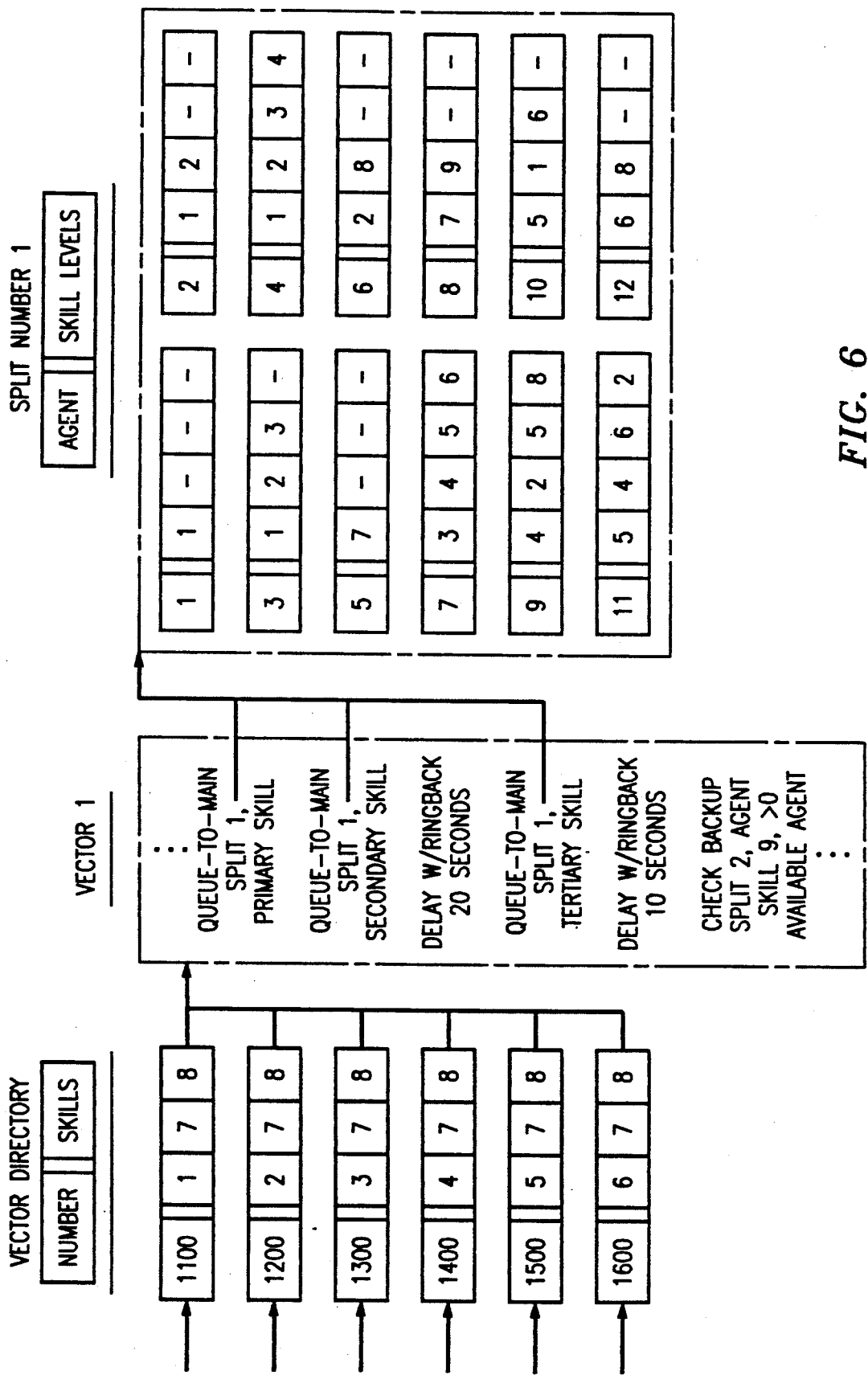
FIG. 6 illustrates the final configuration for the Tourist Information Service example.

In the final example, only the vector need be changed to handle agent-skill 9. The modified vector is shown in FIG. 6.

Just as in the previous example, the caller queues to split 1 with the Primary and Secondary VDN skill, delays 20 seconds, and adds the Tertiary VDN skill to the call. In this final example, however, we delay another 10 seconds at which time we execute a Check-Backup-Split command that will begin to scan for an available agent in Split 2 with agent skill 9. The Check-Backup-Split command will only be executed if the call waits a total of 30 seconds without being answered by an agent in Split 1. After that, Split 2 is examined every 2 seconds for an available agent with agent-skill 9. If there is an available agent in split 2 with agent-skill 9, the call will be re-queued to split 2 and the call will be answered by the available agent in that split. FIG. 6 shows the entire configuration for the final example.

Figure 7:
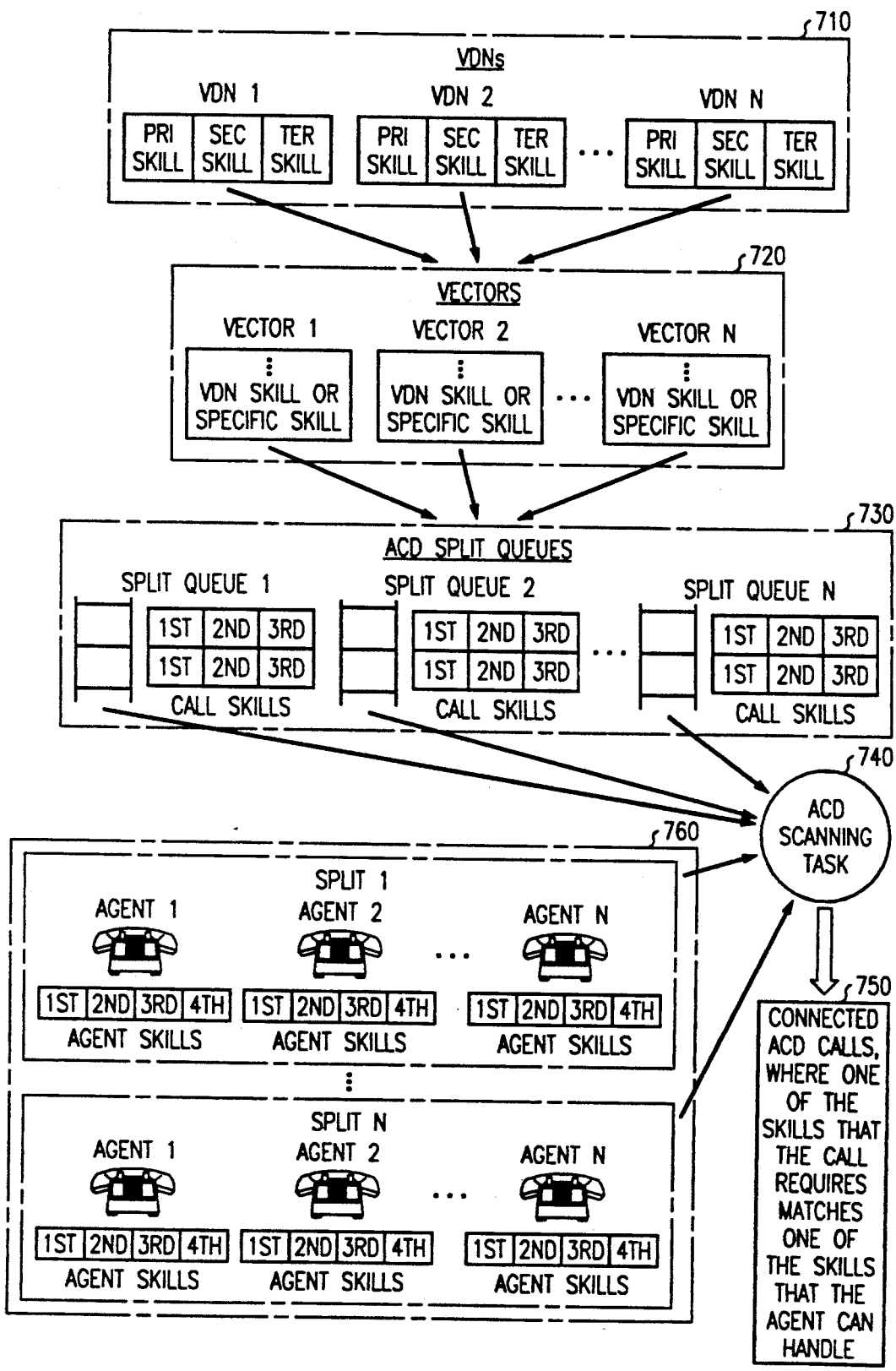
FIG. 7 is a block diagram which summarizes the general operation of matching caller skill requirements with agent skills.

Now that specific examples of the invention have been considered, a more generalized view is presented in connection with FIG. 7 which provides a graphical representation of skill matching in accordance with the invention. FIG. 7 shows a block diagram that summarizes important aspects of the invention. The ACD scanning task 740 scans the incoming call queue and the agent queue associated with each ACD split trying to match caller skill requirements with an agent's call-handling skills. An ACD call acquires skill requirements as it progresses through vector processing. This process is represented by blocks 710, 720, 730. Up to three different skills, designated VDN skills, can be assigned to a VDN. The Primary skill is the skill that is required to handle a call to that VDN. The Secondary and Tertiary are optional skill requirements.

Agent Log In

Agent skills are stored in memory in association with each particular agent, and are automatically activated when the agent either staffs or logs into the system. Agent skill are cleared when the agent unstaffs or logs out, but can be changed by activating different agent skills without logging out. The following procedure applies:
1. Go off-hook on an idle appearance. [Dial tone]
2. Dial Agent Skill Entry access code. [Dial tone]
3. Dial up to four agent skills followed by the #. [Confirmation tone]

To cancel agent skills, the following procedure applies:
1. Go off-hook an idle appearance. [Dial tone]
2. Dial the Agent Skill Entry access code. [Dial tone]
3. Dial #. [Confirmation tone]

The bracketed data is the response to the agent that is delivered by the system. This process is represented by block 760. An agent skill is a number from 1 through 9. A skill can be unique to each ACD split or a common meaning can be defined for a given skill across two or more splits. A call that has one or more skills active can only be delivered to an available agent if the call and the agent have at least one skill in common.

Implementation of FIG. 7 is accomplished in software in the preferred embodiment, although other implementations are clearly possible. Flow diagrams are advantageously used to define the software implementation and can readily be converted into program steps using any one of a variety of computer languages by those reasonably skilled in the art of programming.

Vector Directory Numbers

Block 710 represents the various VDNs at the input, each being a different telephone number that has been dialed by the calling party. Although VDNs are based on the particular telephone number dialed, it is clear that the present invention includes the situation wherein a single incoming telephone number is dialed, but different VDNs are assigned based on such information as time-of-day or the telephone number of the calling party. Telephone Company Automatic Number Identification (ANI) equipment already exists to identify and forward the telephone number of a calling party-a service that is available in various States to thwart nuisance callers. VDNs can be viewed as a particular "door" into the ACD that customers enter seeking service. Customers are steered to that particular door based on the address sought and possibly based on their own address.

For each particular VDN, the System Administrator assigns three different skill numbers according to an estimate of the needs of those persons calling that particular telephone number. These skill numbers are prioritized in the manner taught by the prior examples. ANI information is used in the present invention to anticipate the needs of each calling party through the assignment of skill numbers shown in block 710. For example, referring briefly to FIG. 1, ANI function 225 provides the telephone number of the calling party to ACD 220 which is used in conjunction with the particular telephone number during the assignment of skill numbers. Similar comments are offered with regard to Telephone Company Automatic Location Identification (ALI) equipment which identifies and forwards street address information of a calling party. Such information is already available to emergency (E911) call-answering centers. Accordingly, call-skill numbers may be assigned based on dynamically acquired information (e.g., telephone number and/or address of the calling party), and not solely on fixed information (e.g., the telephone number dialed).

Ideally, an agent possessing the Primary skill needed will be matched with the incoming call as indicated in block 750; however, an advantage of the present invention is that it provides good matches between callers and agents when the very best match cannot be made within a reasonable time. It is difficult to know how long a caller is willing to wait for the "optimum" match. Indeed, the notion of optimum is vague since so little is known about the needs of the caller beforehand. The matching process is carried out using vector processing as shown in FIG. 8 and the ACD scanning algorithm shown in FIG. 9.

Vectors

The vectors shown in block 720 of FIG. 7 comprise logical steps used in processing VDNs such as shown in block 710. In the present invention, each vector comprises a number of steps which specify actions to be taken. These actions relate to the general handling of the call from the perspective of the caller. For example, the vector specifies which queue a caller is assigned to and when the various call-skill numbers are activated. Further, the vector indicates whether music or a message will be returned to the caller, and even the type of message. FIG. 8 discloses the steps associated with Vector 1 shown in FIG. 6. Note that six particular VDNs invoke Vector 1 in FIG. 6 and each receives the same general treatment.

Figure 8:
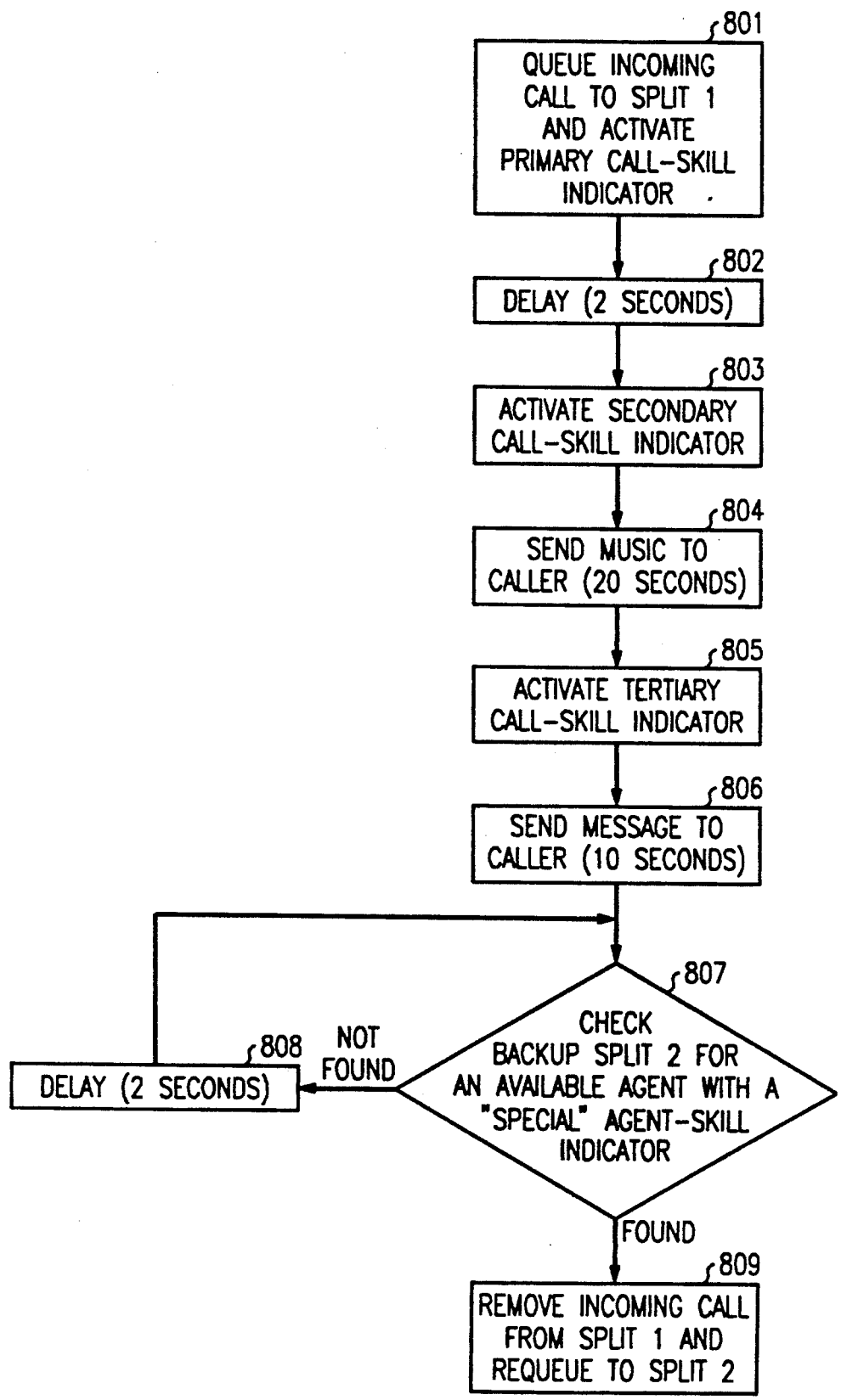
FIG. 8 is a flow diagram that sets forth various command steps within a VDN Vector.

Referring to FIG. 8, block 801 indicates that incoming callers are queued to split 1 and the Primary call-skill requirement is activated. As indicated earlier, the particular split chosen is a function of the telephone extension dialed, in this example, split 1 is appropriate. After a period of time, say 2 seconds, the Secondary call-skill requirement is activated as indicated in blocks 802, 803. This delay allows a search to be made for an agent possessing the exact skill needed before expanding the field of search to include those agents whose skills are acceptable, but less than optimal. The ACD Scanning Algorithm (see FIG. 9) carries out the search based only on the call-skill requirements that have been activated. It is noted that the process shown in FIG. 8 is terminated as soon as a caller is connected to an agent. Such termination is not shown in FIG. 8 for simplification, but is handled as a priority interrupt. Block 804 indicates that a delay of 20 seconds occurs before the Tertiary call-skill requirement is activated as indicated in block 805. Naturally, the various delays chosen are illustrative. In a preferred embodiment of the invention the time delays are selected based on an understanding of the tolerance of caller to different delays. Indeed, one class of callers may exhibit much less tolerance than another class. During the 20-second delay imposed by block 804, music is played for the enjoyment of the caller and to let her know that she has not been forgotten. And during the 10-second delay imposed by block 806, a message is returned to the caller. Accordingly, the specific delays and activities indicated in blocks 802, 804, 806 are solely for the purpose of illustration.

If the incoming caller is not yet connected with an appropriate agent based on a match between any of the skill requirements and available agent skills, then another group of agents, split 2 illustratively, is searched for one having a predetermined skill. In the present illustration, skill 9 represents a special skill possessed by an agent that will facilitate completion of the incoming call. In this illustration, skill 9 is advantageously selected to be the least specific skill that is useful to the caller. For example, skill 9 might be possessed by supervisors having a general knowledge of many subject areas but do not qualify as an expert in them all. However, having already delayed the caller by more than 30 seconds, it is important to make immediate connection to an agent so that the caller (customer) is not lost. Blocks 807, 808 indicate that split 2 is scanned every 2 seconds for an available agent with skill 9 until one is found. However, at this time, the caller remains queued in split 1 so that if an agent possessing any (Primary, Secondary, Tertiary) skill requirement becomes available, a connection will be made thereto and the Vector process of FIG. 8, terminated. Assuming that this does not happen, once an agent possessing skill 9 becomes available, the caller is queued to split 2 (Block 809) and connected with that agent.

ACD Scanning Algorithm

Figure 9:
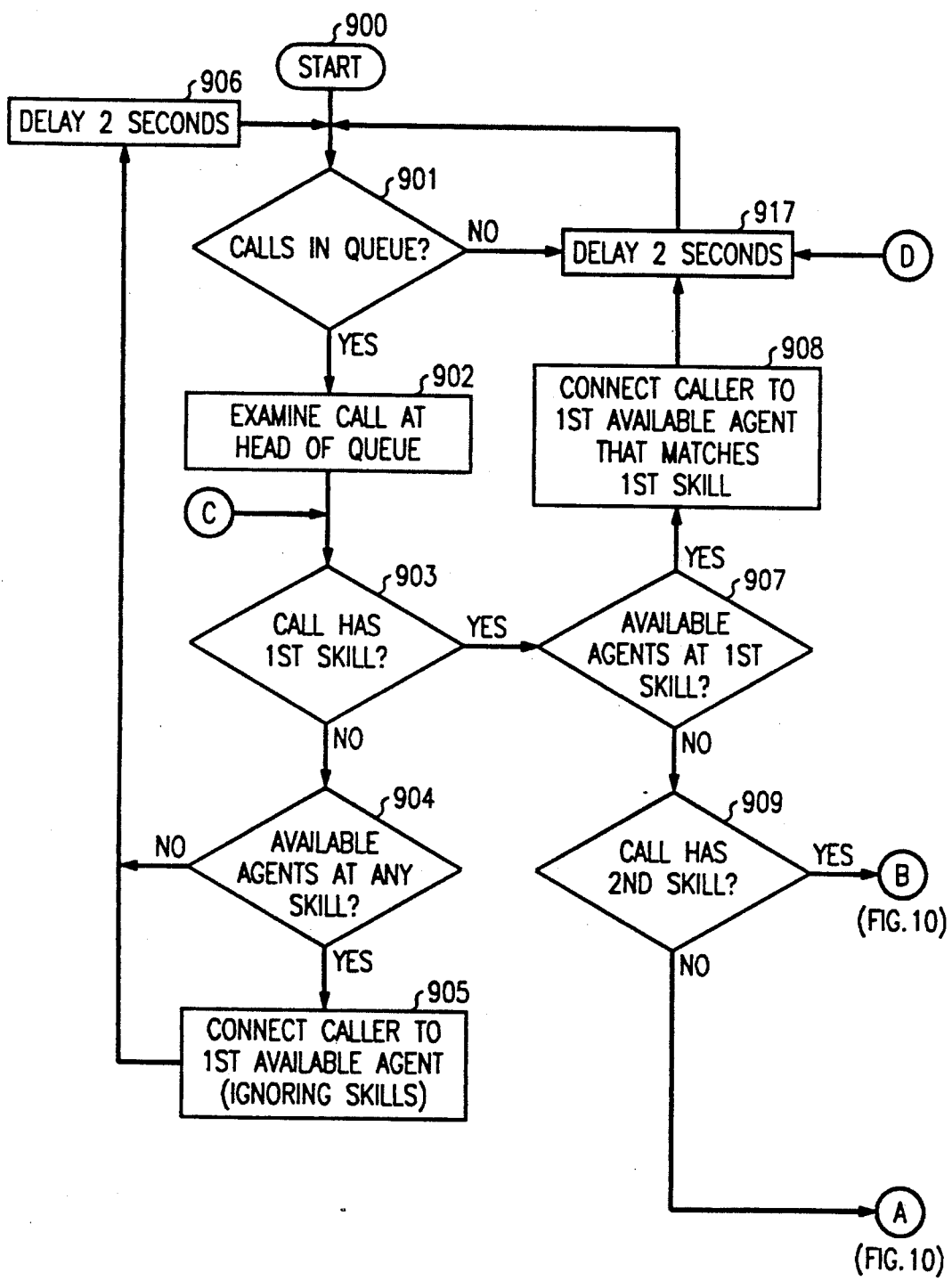
FIGS. 9 and 10 represent a flow diagram that discloses the steps used in an ACD scanning algorithm in accordance with the invention.
Figure 10:
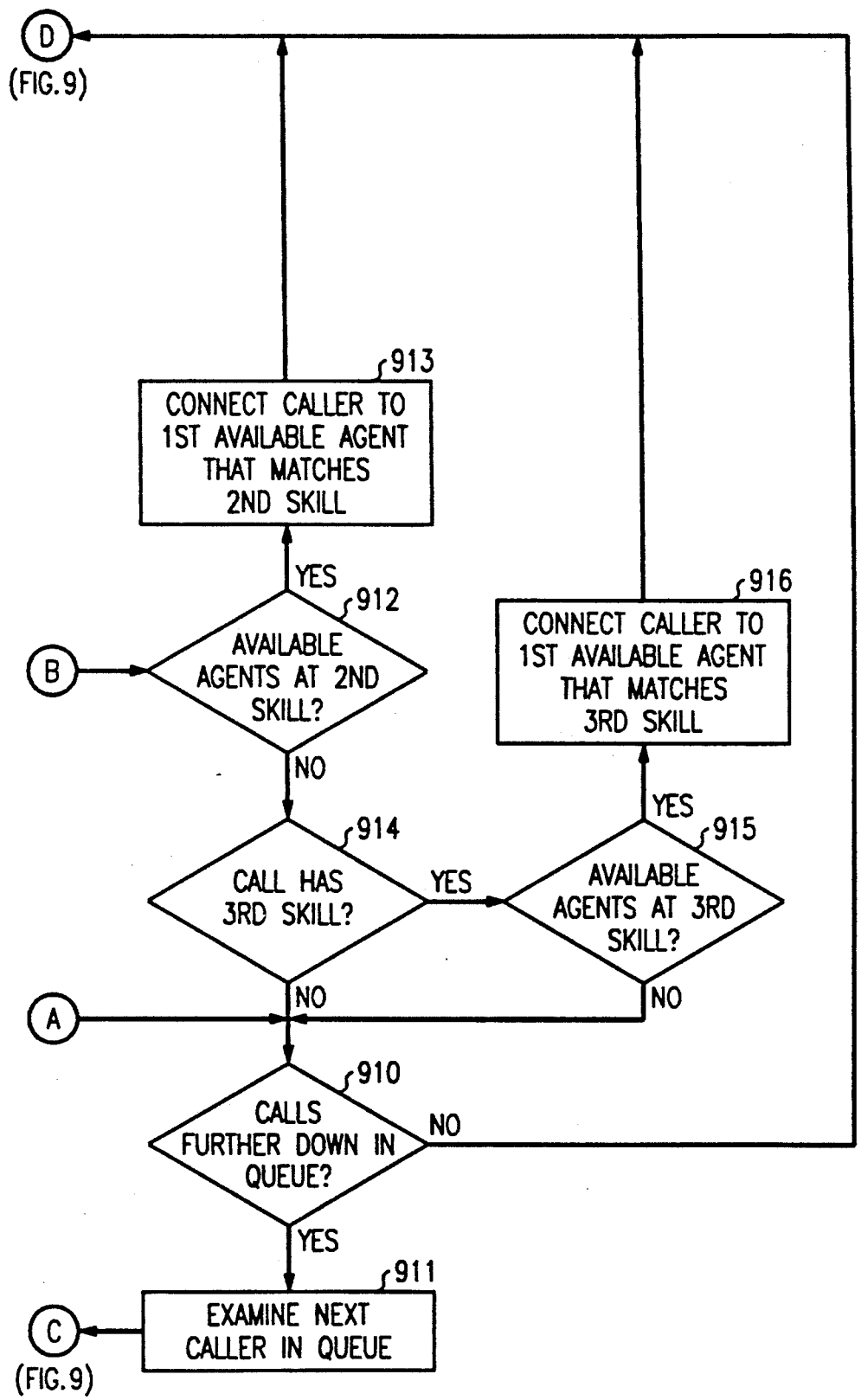

FIG. 9 discloses a flow diagram that illustrates an ACD Scanning Algorithm in accordance with the invention. The scanning algorithm matches incoming calls with available agents and causes the necessary electrical interconnections to be made therebetween. The hardware design of switching apparatus used in making such interconnections is well known to those reasonably skilled in the design of PBX equipment. Accordingly, the details of such a design are omitted. The ACD scanning process is executed by a processor (e.g., microcomputer) in accordance with predetermined instructions stored in a memory. FIG. 9 discloses the various instructions used in that program.

Block 900 of FIG. 9 represents the starting point for the call distribution process. Incoming calls to a particular extension (VDN) are placed in a common queue which is periodically examined. Blocks 901, 902 show that this examination takes place every 2 seconds. Alternatively, the microcomputer carrying out this instruction can achieve the same result by executing another task of short, but unspecified duration, before re-examining whether there are calls in the queue. Block 902 indicates that calls that have been waiting the longest are examined first. The oldest call is at the head of the queue. Associated with each incoming call are three prioritized skill numbers-a code that represents the skills needed by the call. Blocks 904–906 illustrate the default condition whereby skill numbers have not been assigned to calls-a situation possibly encountered when specific agent skills are unnecessary or during the early stages of implementing the the system, but before the invention itself is put in place. When the incoming call has no first skill associated with it, block 904 indicates the search for an available agent having any skill level. Should no agent be found at this time, a 2-second delay is imposed by block 906 and the process starts all over again. In the event that an available agent is found, block 905 illustrates that the call is connected to that agent and then a delay of 2 seconds is imposed via block 906 before moving on to the next call in the queue. It is understood that when a call is connected to an available agent, he is automatically removed from the queue.

Returning to block 903, in the event that the incoming call has a first skill, a search of available agents possessing that first skill is undertaken as indicated in block 907. In the event that an available agent having that first skill is found, block 908 indicates that the call is connected to that agent before returning to block 902 which imposes a delay before searching for the next call in the queue. However, when no available agent can be found having that first skill, the incoming call is examined to see if it has a second-skill as indicated in block 909. If, however, no second skill is found, further attempts on this particular call are temporarily discontinued in favor of the next call in the queue. Block 910 examines whether there are such calls, and if so, block 911 causes the next call to be handled in the same fashion as the prior call starting at block 903. If there are no further calls in the queue, then the process is started all over again after a 2-second delay via block 902. Recall that the just-described steps have been invoked because it was determined at block 909 that the call does not have a second skill indicated. If a second skill is found, however, block 912 indicates that a search of available agents is made having the second skill. In the event that an agent is found possessing the second skill, then block 913 shows that that call is connected to the first available agent with a skill that matches the second skill. As before, that call is removed from the queue and after a 2-second delay, then the next waiting call is handled. When no available agent is found having a skill that matches the second skill, a search to see whether the call has a third skill is undertaken as indicated in block 914. When the call has no third skill indicated, then further attempts on this particular call are temporarily discontinued in favor of the next call in the queue. Once again, block 910 examines whether there are other such calls and if so, block 911 causes the next one to be handled in the same fashion as the previous call starting at block 903. Should, however, a third skill be indicated, then a search for an available agent possessing the third skill is undertaken as indicated in block 915. When an agent is found having a skill that matches the third skill, block 916 instructs that this call be connected to that particular agent. After a delay of 2 seconds, via block 902, the call is removed from the queue and the next call is processed. If, on the other hand, no available agent is found possessing that third skill, then further attempts on this call are temporarily discontinued and the program moves to block 910 whose outcomes have been discussed already.

A perspective is offered regarding the relationship between the vector shown in FIG. 8 and the ACD scanning algorithm of FIG. 9. Whereas the FIG. 8 vector enters and removes calls to and from various queues, the ACD scanning algorithm only relates to the processing of a call within a particular queue. Whereas the FIG. 8 vector activates various call-skill numbers according to its own program, the ACD scanning algorithm only "sees" the call-skill numbers that have been activated. Insofar as caller perception is concerned, only a single process is observed. Nevertheless, the vector and the ACD scanning algorithm are separate, interactive processes.

Although a particular embodiment of the invention has been shown and described, it is understood that various modifications are possible within the spirit and scope of the invention. These modifications include, but are not limited to, the assignment of all agents to a single split, geographically diverse split locations, the use of skill indicators other than numbers, the use of a different amount of skill indicators, the use of an N-digit code that combines skill indicators and split designations, the combination of skill indicators with VDNs to form a new quantity, and the use of non-prioritized call-skill indicators or prioritized agent-skill indicators.

We claim:

1. In automatic call distributing equipment, a method for routing incoming telephone calls to available agents, an available agent being an agent that is presently able to accept an incoming telephone call, the method comprising the following steps:
   entering calls to a particular telephone number into a first queue for service by a first group of agents;
   associating first and second call-skill indicators with each incoming call, each call-skill indicator representing a particular need of the caller;
   associating at least one agent-skill indicator with each agent, the agent-skill indicator representing a particular ability of the agent deemed useful in satisfying a need of the caller;
   searching the agent-skill indicators of the available agents for a match with the first call-skill indicator of the incoming call;
   after a first time interval has expired without finding a match with the first call-skill indicator, expanding the search of agent-skill indicators to include one that matches the second call-skill indicator; and
   connecting the incoming call to the available agent possessing an agent-skill indicator that matches the first or second call-skill indicator of the incoming call.

2. The method of claim 1 wherein the first call-skill indicator is jointly dependent upon the telephone number called and the telephone number of the calling party.

3. The method of claim 1 further including the steps of:
   removing the incoming call from the first queue after a predetermined time interval has elapsed and the call has not been connected to an agent; and
   entering the call into a second queue.

4. The method of claim 1 wherein the call-skill indicators and the agent-skill indicators are numbers that signify particular capabilities needed by callers and possessed by agents respectively.

5. The method of claim 1 wherein the first call-skill indicator is assigned to all calls to a particular telephone number as an estimate of a specific need of the caller.

6. The method of claim 5 wherein the second call-skill indicator is assigned to all calls to the same telephone number.

7. The method of claim 1 further including the steps of:
   associating a third call-skill indicator with each incoming call which represents another particular need of the caller deemed useful in handling the incoming telephone call;
   after a second time interval has expired without finding a match with the first or second call-skill indicators, expanding the search of agent-skill indicators to include one that matches the third call-skill indicator; and
   connecting the incoming call to the available agent possessing an agent-skill indicator that matches the first or second or third call-skill indicator of the incoming call.

8. The method of claim 7 wherein the third call-skill indicator is assigned to all calls to the same telephone number.

9. The method of claim 1 further including the steps of:
   searching for an available agent from among the first group thereof for a predetermined time interval;
   searching for an available agent possessing a special agent-skill indicator, not necessarily the first call-skill indicator, said agent not being part of the first group of agents; and
   connecting the incoming call to the available agent possessing the special agent-skill indicator; whereby incoming calls are routed to available agents in a timely manner and with regard to specific skills possessed by the agents.

10. The method of claim 9 wherein said special agent-skill indicator represents a minimum ability of an agent to handle the incoming telephone call; whereby call completion in a timely manner is further improved.

11. A method for routing incoming telephone calls, made to a particular telephone number, to available agents; the method including the steps of:
   associating indication numbers, including first and second indication numbers, with calls to the particular telephone number, said indication numbers indicating call-handling skills needed by the agent handling calls to the particular telephone number;
   associating at least one of the indication numbers with each of the agents;
   queuing incoming calls to a first group of agents in accordance with the particular telephone number dialed;
   searching for an available agent possessing the first indication number;
   searching for an available agent possessing the second indication number a predetermined time interval after the search for an available agent possessing the first indication number is unsuccessful; and
   connecting the incoming telephone call to the available agent possessing one or both of said first and second indication numbers.

12. The method of claim 11 further including the steps of:
   queueing incoming calls to a second group of agents when the search for an available agent possessing the first or second indication numbers is unsuccessful; and
   searching for an available agent possessing a predetermined indication number other than said first or second indication numbers.

13. An arrangement for matching skill requirements of an incoming telephone caller with skills of one of a plurality of agents, some of the agents being available to handle the incoming caller, comprising:
   means for obtaining a prioritized measure of skill requirements of the incoming caller, said prioritized measure including at least a primary skill requirement and a secondary skill requirement;
   means for obtaining a measure of the skills possessed by the agents;
   means for scanning the skills of the available agents for a match with the primary skill requirement of the caller;
   means for scanning the skills of the available agents for a match with the secondary skill requirement of the caller when a match with the primary skill requirement is not found;
   means for connecting the incoming telephone caller with the available agent possessing a skill that matches one of the skill requirements of the caller; and
   means for delaying the search for an agent possessing the secondary skill requirement by a first predetermined time interval after the search for the primary skill requirement was made; whereby the likelihood of providing the best match between caller and agent, within a predetermined time interval, is improved.

14. The arrangement of claim 13 wherein the prioritized measure further includes a tertiary skill requirement, comprising:
   means for scanning the skills of the available agents for a match with the tertiary skill requirement of the caller when a match with the secondary skill requirement is not found;
   means for connecting the incoming telephone caller with the available agent possessing the tertiary skill requirement of the caller; and
   means for delaying the search for an agent possessing the tertiary skill requirement by a second predetermined time interval after the search for the secondary skill requirement was made; whereby the likelihood of providing the best match between caller and agent, within a predetermined time interval, is improved.

15. In automatic call distributing equipment, a method for routing incoming telephone calls to available agents, an available agent being an agent that is presently able to accept an incoming telephone call, the method comprising the following steps:
   associating a particular call-skill with each incoming call, the call-skill representing a particular need of the caller;
   associating a plurality of agent-skills with the agents including a first agent-skill which exactly matches the particular call-skill and a second agent-skill which almost matches the particular call-skill, each agent having at least one agent-skill;
   searching the agent-skills of the available agents for the first agent-skill;
   waiting a predetermined amount of time for the incoming call to be connected to the available agent possessing the first agent-skill; and then
   expanding the search of available agents to include agents possessing the second agent-skill.

* * * * *